United States Patent
Williams et al.

(10) Patent No.: US 6,388,732 B1
(45) Date of Patent: May 14, 2002

(54) METHOD AND APPARATUS FOR PRODUCING DIGITAL PHOTOGRAPHIC PRINTS

(75) Inventors: Michael J. Williams, Crown Point; Kevin W. Raber, Demotte, both of IN (US)

(73) Assignee: Burrell Professional Labs, Inc., Crown Point, IN (US)

( * ) Notice: Subject to any disclaimer, the term of this patent is extended or adjusted under 35 U.S.C. 154(b) by 0 days.

(21) Appl. No.: 09/229,169

(22) Filed: Jan. 13, 1999

Related U.S. Application Data

(60) Provisional application No. 60/094,999, filed on Jul. 31, 1998.

(51) Int. Cl.[7] .................. G03B 27/52; G03B 27/32; G03D 13/04
(52) U.S. Cl. .................. 355/40; 355/77; 396/639
(58) Field of Search .................. 355/40, 77; 430/21; 348/64; 396/639; 358/487, 506, 449; 380/21, 20

(56) References Cited

U.S. PATENT DOCUMENTS

| | | |
|---|---|---|
| 4,694,354 A | 9/1987 | Tanaka et al. |
| 4,841,359 A | 6/1989 | Hawkins et al. |
| 5,043,758 A | 8/1991 | Nealon |
| 5,101,286 A | 3/1992 | Patton |
| 5,512,396 A | 4/1996 | Hicks |
| 5,784,461 A * | 7/1998 | Shaffer et al. ............... 380/21 |
| 5,978,016 A * | 11/1999 | Lourette et al. .............. 348/64 |
| 6,017,157 A * | 1/2000 | Garfinkle et al. ............ 396/639 |
| 6,154,295 A * | 11/2000 | Fredlund et al. ............ 358/487 |
| 6,154,755 A * | 11/2000 | Dellert et al. ............... 707/526 |

\* cited by examiner

*Primary Examiner*—Russell Adams
*Assistant Examiner*—Peter B. Kim
(74) *Attorney, Agent, or Firm*—Rothwell, Figg, Ernst & Manbeck

(57) ABSTRACT

A method for producing photographic prints includes the steps of optically capturing a plurality of images on an image storage medium, such as photographic film, a photosensitive electronic sensor, or both film and sensor, creating digital image files from the captured images, viewing on a display images produced by the digital image files, selecting desired ones of the plurality of images for printing as photographic prints, and making corrections to the desired images with respect to at east one of cropping, skewing and rotation parameters. The corrections and desired image information are stored in electronic form as an order file and the order file is transmitted to a photographic lab, which uses the transmitted order file to drive image printing equipment to automatically produce from the digital image files the photographic prints.

10 Claims, 3 Drawing Sheets

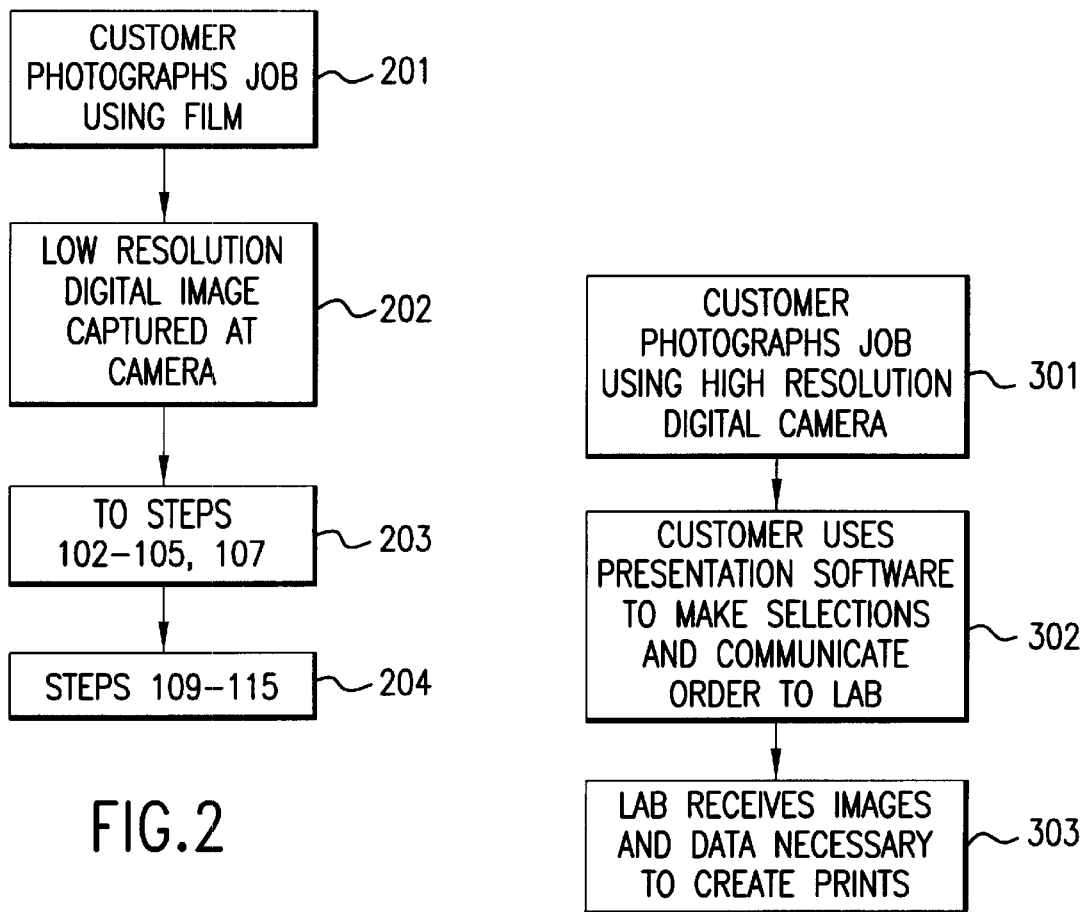

METHOD AND APPARATUS FOR PRODUCING DIGITAL PHOTOGRAPHIC PRINTS

This application claims the benefit of the filing date of provisional patent application Ser. No. 60/094,999, filed Jul. 31, 1998.

BACKGROUND OF THE INVENTION

Field of the Invention and Background

This invention relates to the field of photography, and in particulars to methods and apparatus for producing finished photographic prints of images captured by photographers.

With the advent of affordable powerful computing capabilities and the trend toward electronic commerce (also known as "e-commerce") made possible by the rapid growth and development of the Internet, new opportunities exist for providing digital solutions to the needs of photographers, both professional and amateur.

Various apparatus and methods for processing photographic prints are known in the prior art. See U.S. Pat. No. 5,512,396 to Hicks; U.S. Pat. No. 5,101,286 to Patton; U.S. Pat. No. 5,043,758 to Nealon; U.S. Pat. No. 4,841,359 to Hawkins; U.S. Pat. No. 4,694,354 to Tanaka et al.

While such known prior art methods and systems provide some limited electronic processing of photographs, there exists a need in the art for a comprehensive digital and interactive system whereby photographic print processing is carried out faster, and more efficiently and accurately.

SUMMARY OF THE INVENTION

The present invention provides a method and apparatus for producing photographic prints digitally and interactively, whereby professional photographers will be able to sell their services more effectively, to reduce internal studio labor, and increasing cash flow by realizing shorter production times. Photographic laboratories will be able to speed up production and provide a higher quality product to their customers according to the method for processing orders and improved production workflow contemplated by the present invention.

The process of the present invention is based on data collection at various stages during the process, which data is then used to drive the operation of equipment for producing a final image product.

In particular, the present invention provides a method for producing photographic prints, comprising the steps of optically capturing a plurality of images on an image storage medium, creating digital image files from said captured images, viewing on a display images produced by said digital image files, selecting desired ones of said plurality of images for printing as photographic prints, providing retouching information and making corrections to said desired images with respect to at least one of cropping, skewing and rotation parameters, storing said corrections and said desired image information in electronic form as an order file and transmitting said order file to a photographic lab, and using the transmitted order file at the photographic lab to drive image scanning and printing equipment to automatically produce from said digital image files said photographic prints.

According to another aspect of the invention, apparatus is provided to carry out the above method.

BRIEF DESCRIPTION OF THE DRAWINGS

The present invention will become more completely understood from the following detailed description in conjunction with the accompanying drawings, in which:

FIG. 2 is a flow diagram of a first alternate embodiment of the method of FIG. 1;

FIG. 3 is a flow diagram of a second alternate embodiment of the method of FIG. 1.

DETAILED DESCRIPTION OF THE PREFERRED EMBODIMENTS

Figure 1:
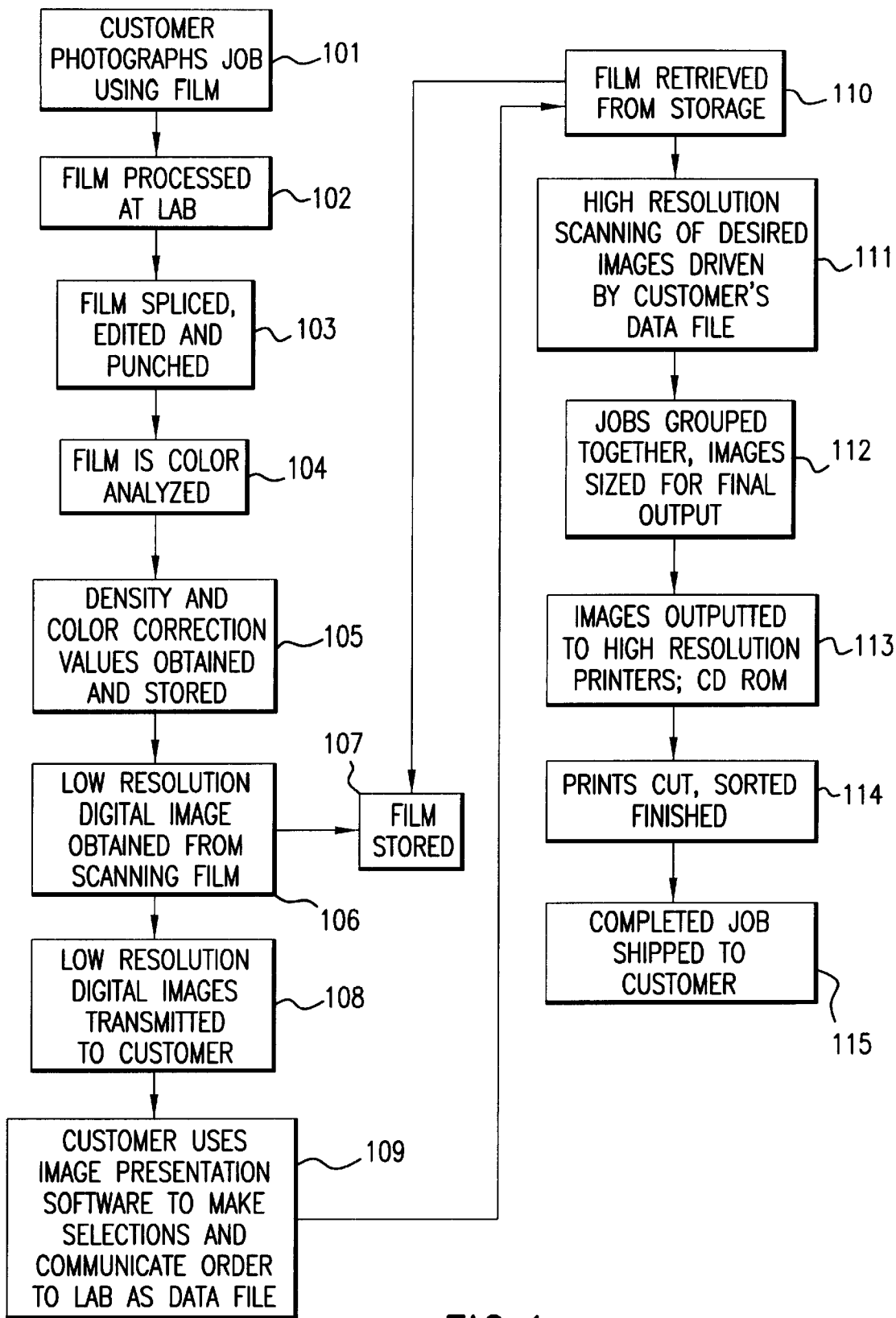
FIG. 1 is a flow diagram of a method for digitally producing photographic prints according to a first embodiment of the present invention.
Figure 4:
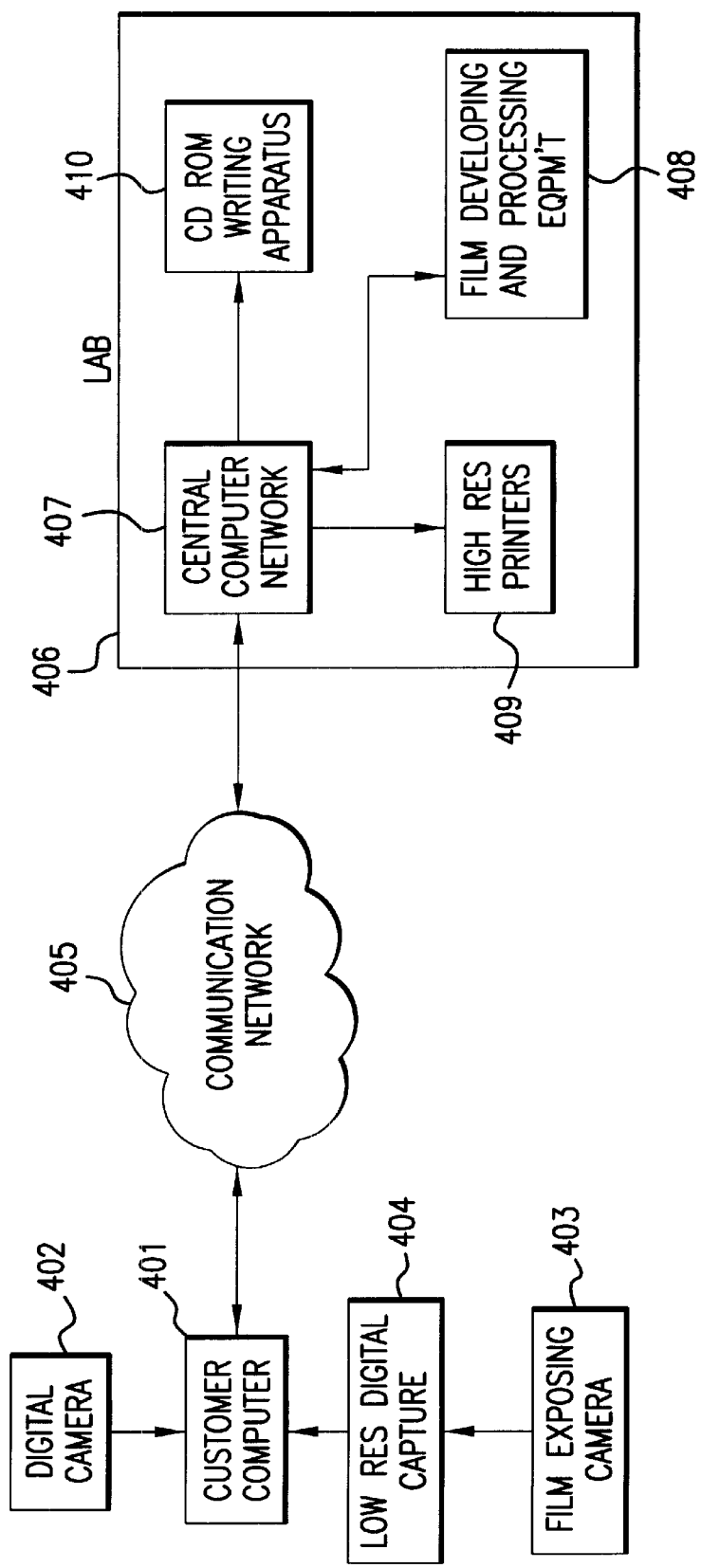
FIG. 4 is a block diagram of a system according to a preferred embodiment of the present invention.

FIG. 1 describes a method according to a first embodiment of the invention, in conjunction with the apparatus shown in FIG. 4. According to the method of FIG. 1, at step 101 a customer (e.g., professional photographer) photographs a job using a conventional camera, such as a Single Lens Reflex (SLR) camera containing photographic film (such as camera 403 in FIG. 4), in which the camera is used to capture images by exposing the photographic film. At step 102, the film is sent by the customer to the photographic lab, where it is processed as is conventionally known in the art. After processing, at step 103 the film is spliced, edited and punched. As an alternative to punching with holes to allow frame registration, it is also known in the art and contemplated by the invention to place optical marks on the edge of the developed film at periodic locations along the roll of film to allow the optical center of the film and the positioning of each frame to be calculated. Additional alternatives to punching may include magnetic or optical components applied to the film at the time of exposure by the camera as a mechanism for frame registration.

Next, at step 104 the film is applied to an analyzer for the purpose of analyzing the image color and density (equipment 408 in FIG. 4). At step 105, density and color correction values, as are known in the art, are obtained as a result of the analysis, and are stored in the central computer of the lab (407 in FIG. 4). At step 106, the film is scanned by a scanning device, such as a device using CCD arrays or other digital, visual or video technology, to obtain a low resolution digital image of each frame of the film. It is here noted that the term "scanning" also encompasses instantaneous image capture, such as where the area of the image sensor covers an entire image frame or frames. This low resolution image is of a resolution that is acceptable for viewing on a display monitor, but does not contain enough data to produce a high quality photographic print. Typical sizes of such low resolution digital image files are 100–500 kb. The low resolution digital image is sent to a server, such as the central computer 407 or other computer, from which the image may be written onto a CD ROM by controlling a CD ROM writing apparatus 410 (FIG. 4), or sent to a customer over the Internet. The digital image file may be recorded using any one of a number of different formats (such as JPEG, GIF, TIF, Targa, BMP, etc.) to accommodate the customer's hardware and software. At step 107, the developed film is stored at the lab pending receipt of an order from the customer. At step 108, the digital images are transferred to the customer. This can be accomplished either by sending the customer the CD ROM having the image files stored thereon, by sending the customer the image files through e-mail, or by placing the image files onto an Internet server which the customer may log on to in order to download the image files.

Once the customer is in possession of the low resolution image files, at step 109 the customer views the images using an appropriate, commercially available image presentation program, or a custom image presentation program. For example, the customer may view the files with his or her client at the customer's studio. The customer selects the frames desired to be processed as final prints. For each desired frame, the customer is able to make skewing, cropping and rotation corrections to the images, wherein the image may be straightened and unwanted areas removed with respect to the frame. The customer also uses the presentation software to select quantities, sizes, and special instructions such as mounting and finishing as well as art services that may be desired, such as border additions, and retouching instructions, such as removal of subjects or objects, eliminating facial blemishes, etc.

After the session with the customer's client, the order information is formatted as a file, and this file may be transmitted to the lab by e-mail or by downloading directly to the lab's Internet server. At step 110, once the lab receives the order from the customer, the stored film is retrieved from storage. At step 111, the retrieved film is scanned to create high resolution digital image files. The scanning equipment in this instance can be automatically driven by instructions obtained from the information contained in the customer's order file, as to the identity of frames desired for final print processing, and as to the instructions for cropping, skewing and rotation correction. As such, no manual intervention at the lab is required (other than possible retouching according to customer requests) in order to produce high resolution digital images for processing as a customer order.

At step 112, a packaging device software program is used by the lab's computer to group jobs together and size the images for final output. The final images are then outputted at step 113 to high resolution, high quality printers (409 in FIG. 4), such as small format printers, or large format printers as appropriate, to produce high quality photographic paper prints of the selected images. Additionally, the final image files may be written to a CD ROM as archival material for the customer's future reference and use for reorders.

At step 114, the prints are subjected to cutting, sorting and finishing processes, and at step 115 the completed job containing the prints, and optionally a CD ROM and the roll of film, is packaged and shipped to the customer.

According to an alternate embodiment as shown in FIG. 2, at step 202 customer may capture low resolution digital images while exposing film in a camera at step 201. Such low resolution capture may be obtained by a capture device attached to the camera (404 in FIG. 4). Such a device usually contains a beam splitter which reflects part of the light of the image from the lens of the camera to the film, and another part of the light from the lens to a digital capture device such as a CCD array. In this way, images are captured on film and in digital form simultaneously. The customer sends the exposed film to the lab at step 203, where the same steps as 102–105 and 107 are performed, followed at step 204, by steps 109–115 of the method of FIG. 1. According to the method of FIG. 2, there is no need to perform steps 106 and 108 at the lab. Instead, the customer uses the already obtained low resolution digital images with the presentation software to make selections and skewing, cropping and rotation corrections. The customer then sends the order file from his or her computer 401 via a communication network 405, such as the Internet, to the central computer 407 located at the lab 401.

According to another alternate embodiment as disclosed in FIG. 3, a customer at step 301 may shoot a job using a high quality digital camera (402 in FIG. 4). The digital camera produces both low and high resolution digital image files, without the need for photographic film. At step 302, the customer loads the low resolution files into the image presentation software, makes selections and notes particular corrections to be made to the images, and saves the selection and correction information as an order file which is transmitted to the lab along with the high resolution digital image files.

At step 303, the lab has received the high resolution digital image files from which high quality photographic prints may be obtained, along with information concerning the identity of desired frames, the size, quantity and finishing for the frames, as well as information concerning cropping, skewing and rotation correction to the image frames.

At step 304, the high resolution images and customer provided information are sent to high resolution printers for producing high quality photographic prints, as well as to a CD ROM for archival storage. The prints are finished and sorted at step 305, and the completed job is packaged and shipped to the customer at step 306.

The present invention thus provides a method and apparatus that provides increased efficiencies and accuracy to the production of photographic prints, as well as containing flexibility to adapt to new image processing technologies which may be developed in the future.

The invention having been thus described, it will be apparent to those skilled in the art that the same may be varied in many ways without departing from the spirit and scope of the invention. Any and all such modifications are intended to be included within the scope of the following claims.

What is claimed is:

1. A method for producing photographic prints, comprising the steps of:
    optically capturing a plurality of images on an image storage medium;
    creating digital image files from said captured images;
    viewing on a display images produced by said digital image files, selecting desired ones of said plurality of images for printing as photographic prints, and making corrections to said desired images with respect to at least one of cropping, skewing and rotation parameters;
    storing said corrections and said desired image information in electronic form as an order file and transmitting said order file to a photographic lab; and
    using the transmitted order file at the photographic lab to drive image printing equipment to automatically produce from said digital image files said photographic prints.

2. The method of claim 1, wherein the step of capturing comprises the step of exposing photographic film, and the step of creating digital images comprises the step of developing the exposed film and scanning the developed film.

3. The method of claim 1, wherein the step of capturing comprises the step of focusing images onto a photosensitive electronic sensing device to develop electrical signals, and the step of creating digital images comprises the step of converting said electrical signals into digital information and storing said digital information as a digital file.

4. The method of claim 1, further comprising the step of creating low resolution digital images for viewing in said viewing step, and the step of creating high resolution digital images for the step of using the transmitted order file to produce photographic prints.

5. The method of claim 1, wherein the order file is transmitted to the lab via e-mail transmission.

6. The method of claim 1, wherein the order file is transmitted directly to an Internet server of the lab.

7. Apparatus for producing photographic prints, comprising:

means for optically capturing a plurality of images on an image storage medium;

means for creating digital image files from said captured images;

means for displaying images produced by said digital image files, selecting desired ones of said plurality of images for printing as photographic prints, and making corrections to said desired images with respect to at least one of cropping, skewing and rotation parameters;

means for storing said corrections and said desired image information in electronic form as an order file and transmitting said order file to a photographic lab; and means for using the transmitted order file at the photographic lab to drive image printing equipment to automatically produce from said digital image files said photographic prints.

8. Apparatus for producing photographic prints according to claim 7, wherein said means for optically capturing a plurality of images on an image storage medium comprises a camera which exposes photographic film.

9. Apparatus for producing photographic prints according to claim 7, wherein said means for optically capturing a plurality of images on an image storage medium comprises a digital camera having an electronic image sensing device.

10. Apparatus for producing photographic prints according to claim 7, wherein said means for creating digital image files from said captured images comprises an image scanner.

\* \* \* \* \*